(12) United States Patent
Wong (10) Patent No.: US 8,353,244 B2
(45) Date of Patent: Jan. 15, 2013

(54) INTEGRATED CLEANING AND CUTTING DEVICE

(76) Inventor: Yan Kwong Wong, Hong Kong (CN)

(*) Notice: Subject to any disclaimer, the term of this patent is extended or adjusted under 35 U.S.C. 154(b) by 731 days.

(21) Appl. No.: 12/561,199

(22) Filed: Sep. 16, 2009

(65) Prior Publication Data

US 2010/0071568 A1 Mar. 25, 2010

(30) Foreign Application Priority Data

Sep. 17, 2008 (CN) .................. 2008 2 0147468 U (51) Int. Cl.
*A47J 43/14* (2006.01)
*A23N 1/00* (2006.01)
(52) U.S. Cl. .............. 99/495; 99/537; 426/443
(58) Field of Classification Search ............ 99/410–418, 99/479, 485, 495, 518, 537, 538; 494/11, 494/37, 46, 60, 62, 63, 84; 426/443, 478, 426/601
See application file for complete search history.

(56) References Cited

U.S. PATENT DOCUMENTS

| | | | | | |
|---|---|---|---|---|---|
| 5,156,084 | A | * | 10/1992 | Lin ................................. | 99/495 |
| 5,562,025 | A | * | 10/1996 | Bull et al. ...................... | 99/495 |
| 5,904,090 | A | * | 5/1999 | Lillelund et al. ............... | 99/495 |
| 6,343,090 | B1 | * | 1/2002 | Yoo et al. ...................... | 372/96 |
| 7,975,605 | B2 | * | 7/2011 | Wan et al. ..................... | 99/495 |
| 7,975,948 | B2 | * | 7/2011 | Holcomb et al. .......... | 241/169.1 |

* cited by examiner

*Primary Examiner* — Kien Nguyen
(74) *Attorney, Agent, or Firm* — Global IP Services; Tianhua Gu (57) ABSTRACT

An integrated cleaning and cutting device includes a case, a cover sealed the case, a basket received in the case, and a basket shelter mounted on the basket. A plurality of palings is formed on the basket. A drive mechanism is accumulated in the cover for driving the basket to rotate in the case. A cutting mechanism is fitted in the cover for cutting salad material. The cutting mechanism includes a blanking hole communicating with the basket in the case. The salad material is cleaned in the basket by the rotating of the basket in the case. On the other hand, the salad material can be cut and stored in the device, in which the basket and the cutting mechanism are equipped. Since the device has multiple functions such as cleaning, cutting and storage, it is utilitarian in use.

18 Claims, 9 Drawing Sheets

INTEGRATED CLEANING AND CUTTING DEVICE

BACKGROUND

1. Technical Field

The present disclosure relates generally to a salad making device, and more particularly to an integrated device for making fruit or vegetable salad, in which the fruits or vegetables contained can also be cleaned and cut.

2. Description of Related Art

When people host guests at home, they often provide the guests with fruits such as apples or pears after a meal. However, a whole apple or a whole pear is too much for one just after finishing the meal. Further, having a single kind of fruit, such as an apple or a pear, may not be as appealing to the guests as having different kinds of fruit. Therefore, a vegetable and/or fruit salad is usually provided instead of the single fruit.

Generally, a process of making salad includes cleaning the fruits or vegetables; cutting the fruits or vegetables into different shapes such as a cube, a slice, or a shred; putting the cut fruits or vegetables into a container and adding salad dressing; and stirring the mix of the salad dressing and the cut fruit or vegetables. Such process utilizing a lot of instruments such as containers, knives/cleavers, and utensils which are also needed to be cleaned after making the salad, is so time-consuming and troublesome.

SUMMARY

An object of the present disclosure is to provide an integrated cleaning and cutting device for making salad, in which the salad material can be cleaned, cut and stored within the single device, thus reducing the numbers of vessels and instruments used during the making of salad and simplifying the process of making salad.

The integrated cleaning and cutting device provided in the present disclosure includes a case, a cover covering the case, a basket received in the case, with a plurality of palings formed thereon, and a basket shelter, such as a wave shape basket shelter, mounted on the basket, wherein a drive mechanism is coupled to the cover for driving the basket to rotate in the case, and a cutting mechanism is fitted in the cover adapted for cutting salad material, which comprises a blanking hole communicated with the basket in the case.

In the integrated cleaning and cutting device, the drive mechanism comprises a shaft inserted in a middle of the cover, with the bottom end thereof affixed to the middle of the basket shelter, and the top end thereof rotationally engaged with a wheel embedded in a top surface of the cover, the wheel having a handle to operate the wheel to rotate.

In one of the embodiments of the integrated cleaning and cutting device, a plurality of planet gears are formed on side walls of the wheel, and a plurality of gears are formed on the top end of the shaft such that the plurality of gears of the shaft engages with the planet gears of the wheel to form a planet gear mechanism between the wheel and the shaft.

In the integrated cleaning and cutting device, a brake block is embedded in the top surface of the cover and located at a lateral side of the wheel for decelerating the rotating of the wheel.

In the integrated cleaning and cutting device, a plurality of orientation grooves are defined in the edges of the basket shelter for engagingly receiving the basket.

In the integrated cleaning and cutting device, an opening is defined in the cover, and the cutting mechanism further comprises a cutting board fitted in the opening, the cutting board having blades mounted thereon, and the blanking hole being designed in the basket shelter to correspond to the opening of the cover.

In the integrated cleaning and cutting device, the cutting mechanism further comprises a scrub rod with a plurality of pins formed at bottom end thereof adapted for inserting into the salad material.

In the integrated cleaning and cutting device, a slideway is defined above the opening of the cover, and the cutting mechanism further comprises a scrub board having a slide rail at bottom thereof for matching the slideway, and a plurality of pins formed at the bottom thereof adapted for inserting into the salad material.

In the integrated cleaning and cutting device, a grab handle extends from the scrub board opposite to the slide rail of the scrub board.

In the integrated cleaning and cutting device, a scrub rod is embedded in the grab handle with a plurality of additional pins formed at bottom thereof adapted for inserting into the salad material.

Multiple beneficial effects can be obtained by utilizing the present device described hereinafter. The cleaning fluid can be filled in the case with a cover sealed thereon. The salad material such as apples or pineapples can be contained in the basket with palings formed thereon, and further contained in the case and cleaned by the cleaning fluid. The drive mechanism coupled to the cover can be conveniently operated by the handle to drive the basket to rotate in the case, whereby the salad material is cleaned in the rotating basket. In addition, the cleaned salad material can be cut on the cutting mechanism fitted in the cover and directly fall into the basket via a blanking hole of the basket shelter from the cutting mechanism communicated with the basket. The cut salad material can be taken out from the case at one time by taking the basket out of the case, and put into a stirring container, in which salad dressing may be added to be stirred with the cut salad material to make salad. Utilizing the present device solely, one can both clean and cut the salad material. Furthermore, the basket having an artistic appearance can be directly used as a vessel for serving the salad. Thus, the plurality of containers and instruments conventionally used in making salad is reduced. Further, the case can contain some clean water while the salad material is being cut, so that the cut salad material is immersed therein, to prevent the cut salad material being oxidized from contacting with the atmosphere, and so that the cut salad material retains freshness.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
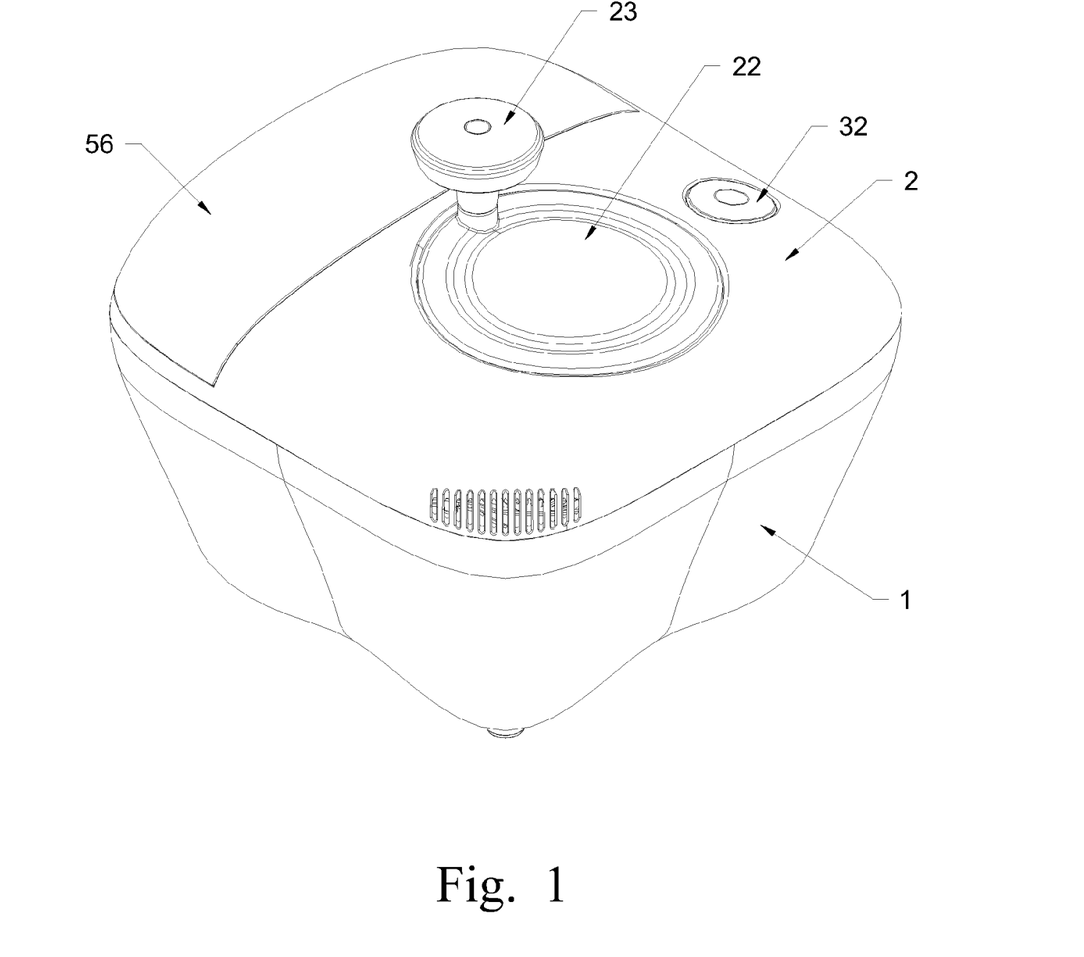
FIG. 1 is an isometric, assembled view of an integrated cleaning and cutting device in accordance with a first embodiment of the present disclosure.
Figure 2:
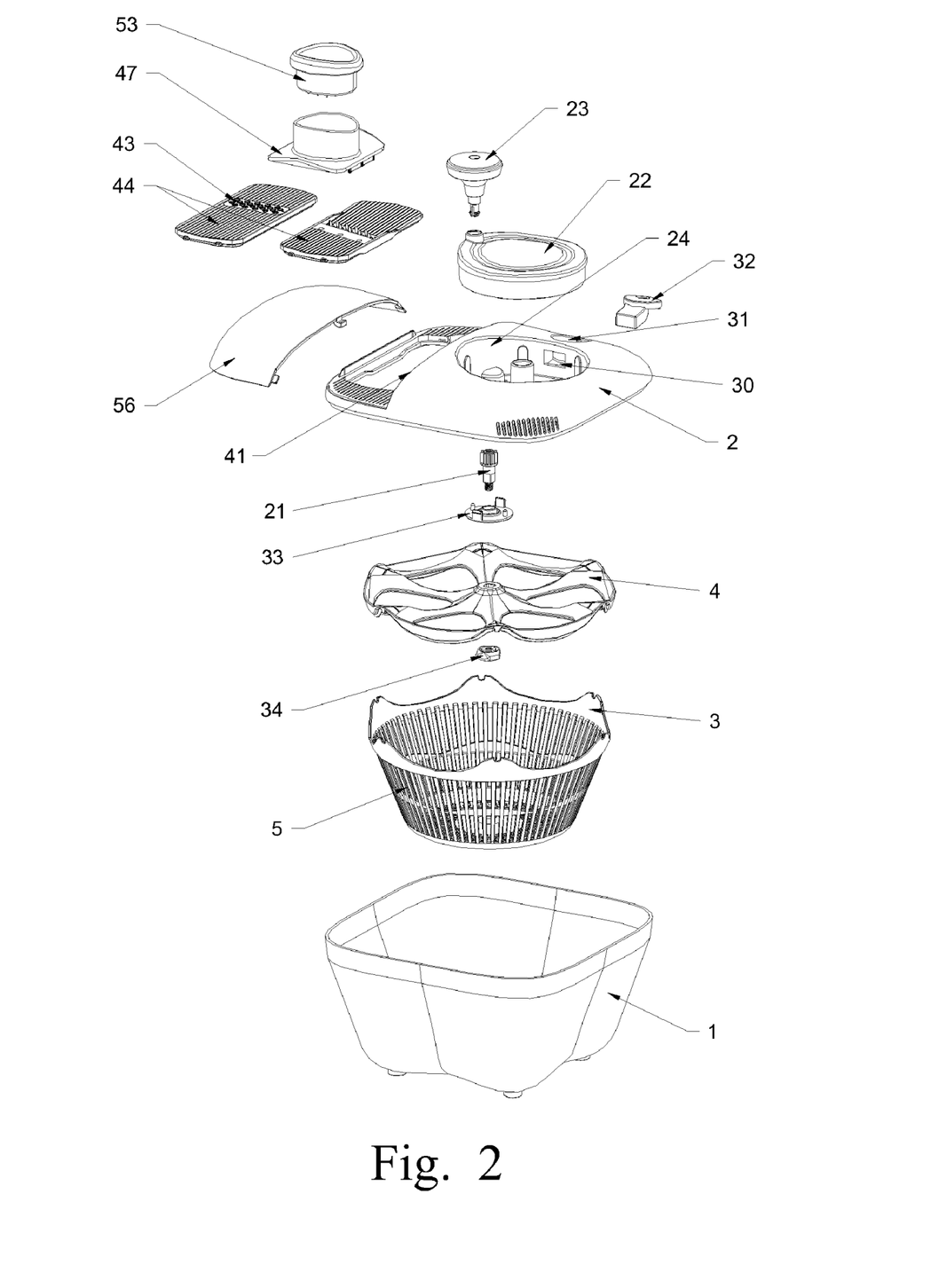
FIG. 2 is an exploded view of the integrated cleaning and cutting device of FIG. 1.
Figure 3:
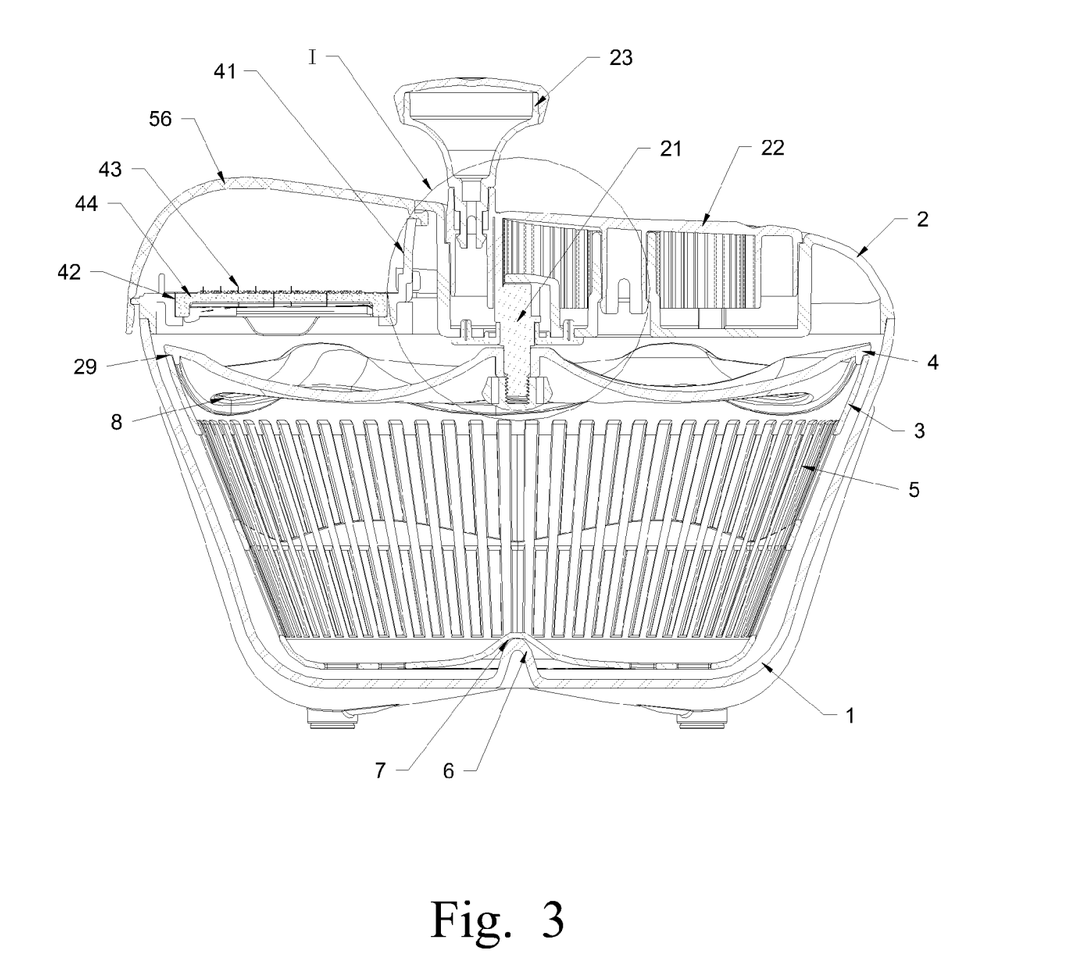
FIG. 3 is a cross-sectional view of the integrated cleaning and cutting device of FIG. 1.

FIGS. 1-3 illustrate an integrated cleaning and cutting device in accordance with a first embodiment of the present disclosure. The integrated cleaning and cutting device comprises a case 1, a cover 2 covering the case 1, a basket 3 received in the case 1 and a basket shelter 4 mounted on the basket 3. The case 1 is sealed by the cover 2 to avoid the cleaning fluid spilling out of the case 1 at the time of cleaning salad material such as fruits or vegetables contained therein. The basket shelter 4 prevents the fruits or vegetables sliding out of the basket 3, and drives the basket 3 to rotate in the case 1. The basket 3 has a plurality of palings 5 to allow the cleaning fluid to flow throughout.

Referring to FIGS. 2, 3, 4, 5 and 11, a drive mechanism is coupled to the cover 2 for driving the basket 3 rotating in the case 1. Specifically, a convex bulge 6 protrudes upwardly from a middle bottom of the case 1. Corresponding to the bulge 6 of the case 1, a concave dent 7 is defined in a middle bottom of the basket 3. The basket 3 is rotatably received in the case 1 with the bulge 6 inserted in the dent 7. The basket 3 and the case 1 have no other parts contacted with each other except the attachment of the bulge 6 and the dent 7. In an alternative embodiment, a shaft can be formed in the middle bottom of the case 1 to match an axle hole defined in the middle bottom of the basket 3 to render the basket 3 rotates in the case 1 around the shaft.

Figure 11:
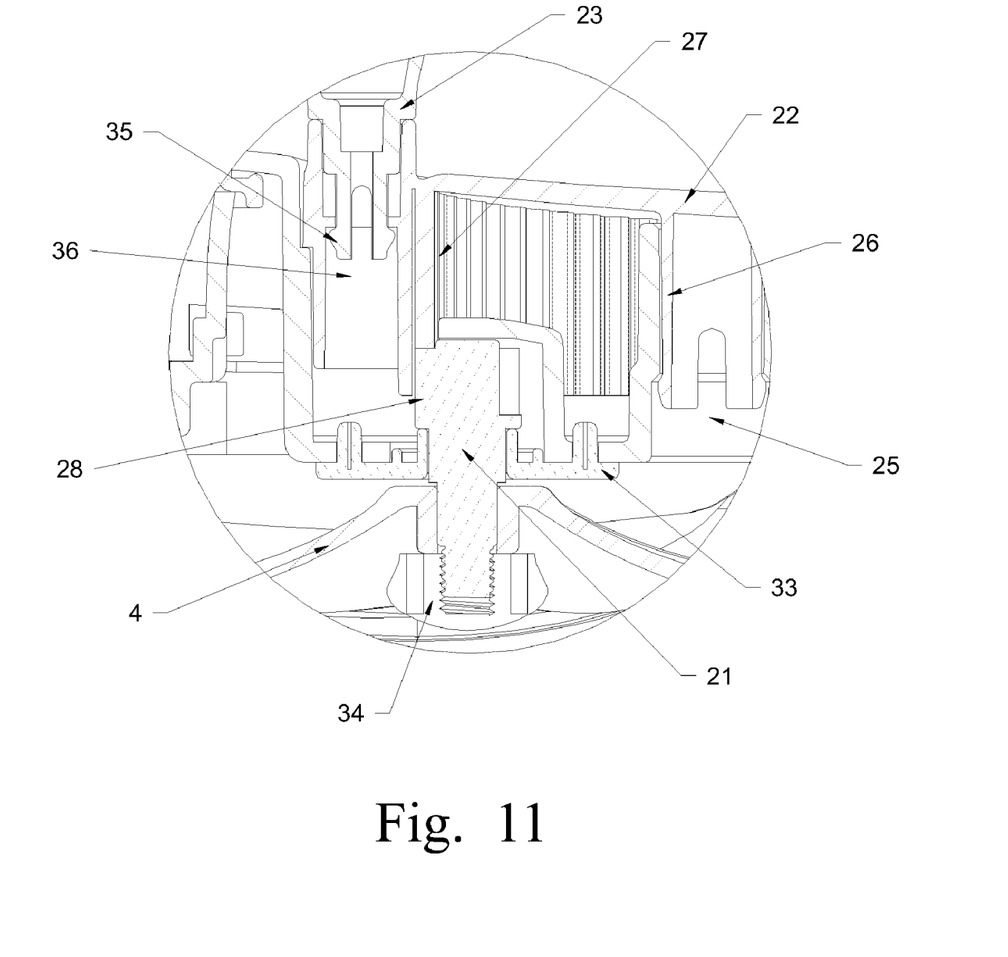
FIG. 11 is an enlarged view of part I in FIG. 3.

The drive mechanism comprises a shaft 21 rotatably inserted in the middle of the cover 2, and a wheel 22 bringing the shaft 21 to rotate. A handle 23 is formed on the wheel 22. The bottom end of the shaft 21 is connected with the center of the basket shelter 4, and the top end of the shaft 21 is engaged with the wheel 22 via gears to form a planet gear mechanism. In detail, as shown in FIGS. 2, 3 and 11, a chuck 33 is located beneath the cover 2 and rotatably connects the shaft 21 and the cover 2 together. After the shaft 21 inserted through the middle of the basket shelter 4, a nut 34 is engaged with the bottom end of the shaft 21 to rigidly connect the shaft 21 and the basket shelter 4 together. A plurality of claws 35 are formed at bottom end of the handle 23. A hole 36 is defined in a top surface of the wheel 22 biasing the center thereof. The claws 35 are inserted into the hole 36 to thereby secure the handle 23 on the wheel 22 eccentrically.

As shown in FIGS. 2, 3, 5 and 11, a receiving room 24 is defined in the top of the cover 2 for receiving the wheel 22 therein. A sleeve 25 is formed at the center of the receiving room 24. A spindle 26 is formed at the middle bottom of the wheel 22 and rotatably received in the sleeve 25, whereby the wheel 22 can rotate in the receiving room 24 around the sleeve 25 when driving the handle 23 along a circumferential direction of the wheel 22. The top end of the shaft 21 is exposed in the receiving room 24 and forms a plurality of external gears 28 thereon. A plurality of internal gears 27 are formed in an inner side of the side walls of the wheel 22 to engage with the external gears 28 of the shaft 21. A planet gear mechanism is thus obtained between the shaft 21 and the wheel 22 after the wheel 22 is positioned in the receiving room 24, and the shaft 21 is rotated following the rotating of the wheel 22. A diameter of the internal gears 27 of the wheel 22 is larger than that of the external gears 28 of the shaft 21, thus, the rotating speed of the shaft 21 is greater than that of the wheel 22, whereby a high rotating speed of the shaft 21 (i.e., of the basket 3) is easily performed, and the cleaning fluid contained in the case 1 is stirred adequately by the basket 3, which is beneficial for cleaning the salad material in the case 1. In an alternative embodiment, the external gears can be formed outside of the spindle 26 and engaged with the internal gears formed on the shaft 21 to perform the rotating of the shaft 21 following the rotating of the wheel 22, and the speed ratio of the shaft 21 to the wheel 22 can be designed to obtain a desired rotating speed of the basket 3. In another alternative embodiment, the spindle 26 can also be aligned with the shaft 21, that is, the wheel 22 can be directly connected with the top end of the shaft 21, wherein the wheel 22 can bring the shaft 21 to rotate.

In use, the salad material such as various kinds of fruits and vegetables are put into the basket 3. Cleaning fluid such as water or cleaning solution is filled in the case 1. The basket 3 with the salad material is put into the case 1 and sealed with the cover 2. Preferably, the basket 3 and the basket shelter 4 are configured to be revolving bodies, such that the basket shelter 4 conveniently engages with the basket 3. In addition, edges of the basket shelter 4 connecting to the basket 3 are configured to be waved in shape, which automatically guides the basket shelter 4 to engage with the basket 3. Further, the bottom face of the basket shelter 4 is uneven, which can force the salad material floating in the cleaning fluid to move up and down, to adequately clean the salad material. During cleaning, the shaft 21 is rotated following the rotating of the wheel 22 by driving the handle 23. The basket shelter 4 rotates via the shaft 21 due to the connection with the bottom end of the shaft 21, which also drives the basket 3 to rotate around the bulge 6 in the case 1, since the basket shelter 4 also connects the basket 3. The cleaning fluid in the case 1 is stirred by the basket 3, on which the plurality of palings 5 are formed, to clean the salad material. Then, the salad material can be taken out from the case 1 at one time by taking out the basket 3, instead of taking out pieces of salad material one by one. At last, the cleaning fluid is poured out from the case 1.

In the present embodiment, a transverse hole 30 is defined in a side wall of the receiving room 24 to communicate with a vertical hole 31 defined in the top surface of the cover 2. A brake block 32 made of elastic material is received in the vertical hole 31. The rotation of the wheel 22 and the basket 3 can be actively stopped by pressing the block 32 to deform and protrude from the transverse hole 30 to scrub the side wall of the wheel 22. Thus, the continuous rotation of basket 3 in the case 1 causing spilling of the cleaning fluid after opening the cover 2 can be prevented.

Figure 4:
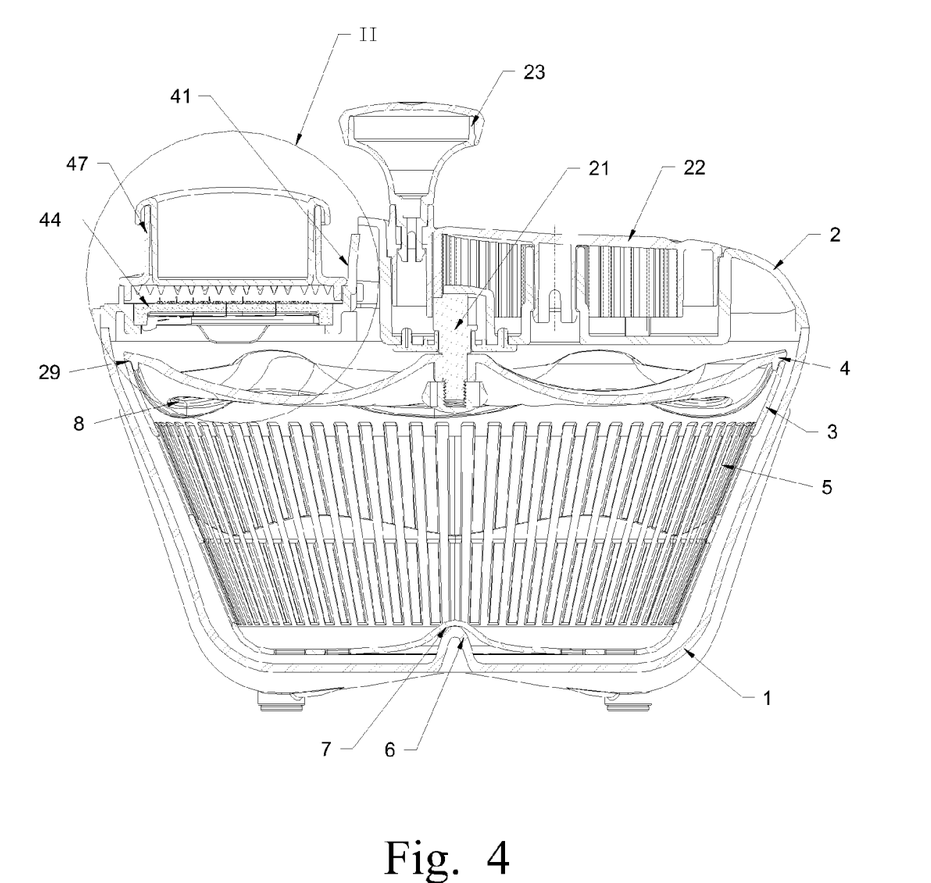
FIG. 4 is a view similar to FIG. 3, in which a scrub board of the integrated cleaning and cutting device is assembled.
Figure 5:
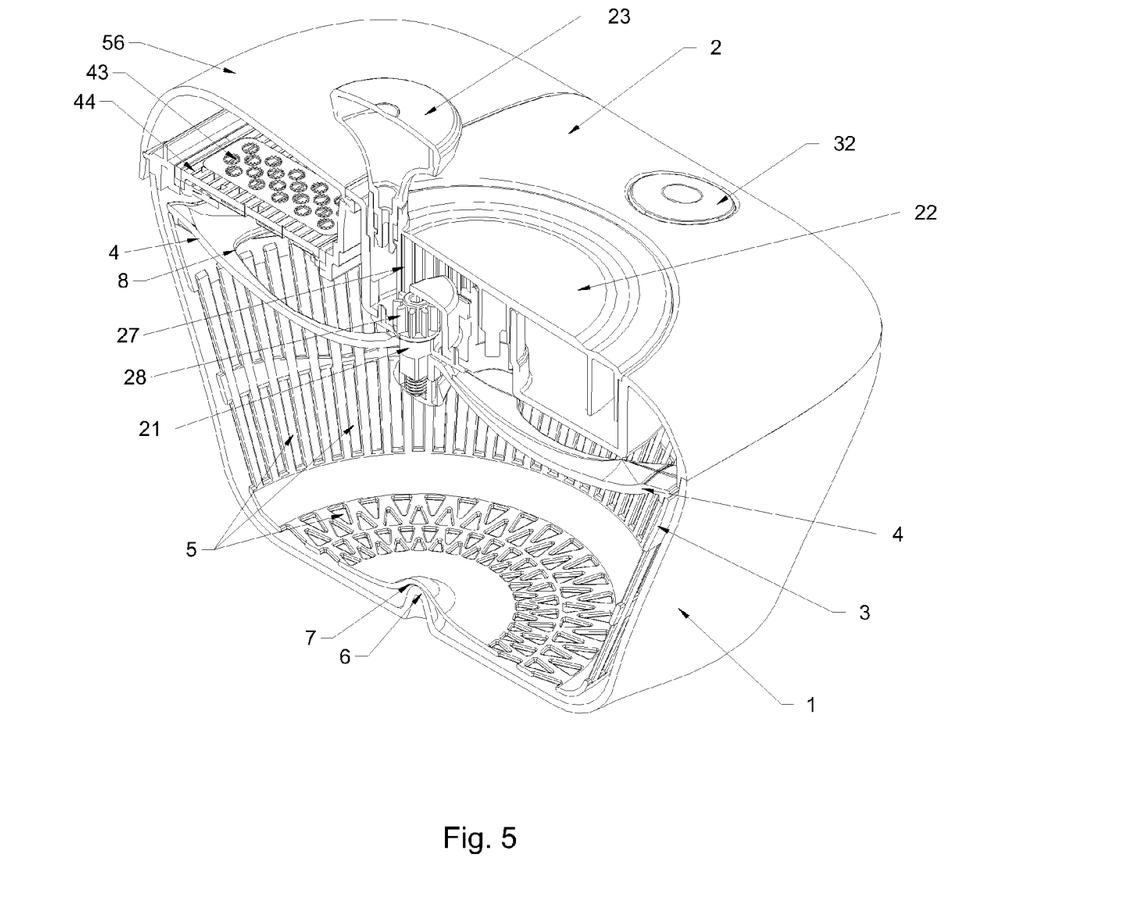
FIG. 5 is an isometric solid view of the integrated cleaning and cutting device in FIG. 4.
Figure 6:
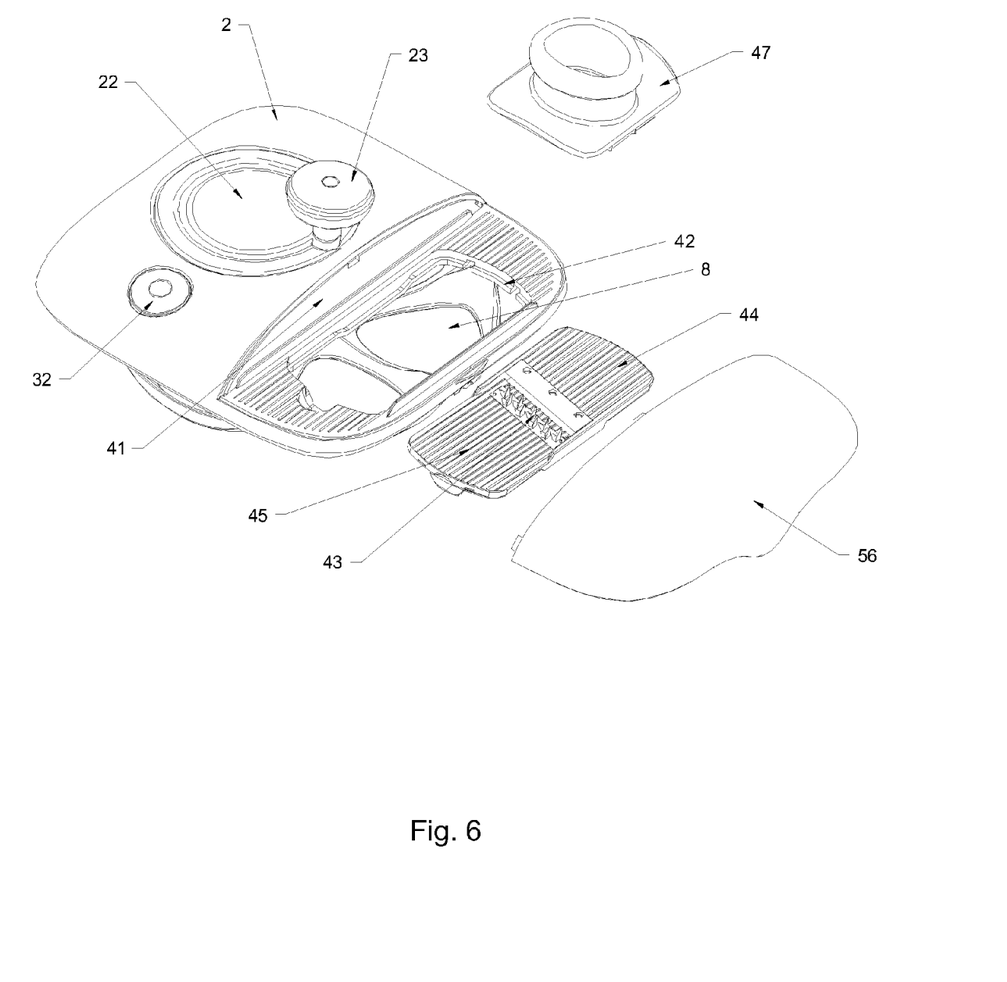
FIG. 6 is an exploded view of a cover of the integrated cleaning and cutting device of FIG. 1.
Figure 7:
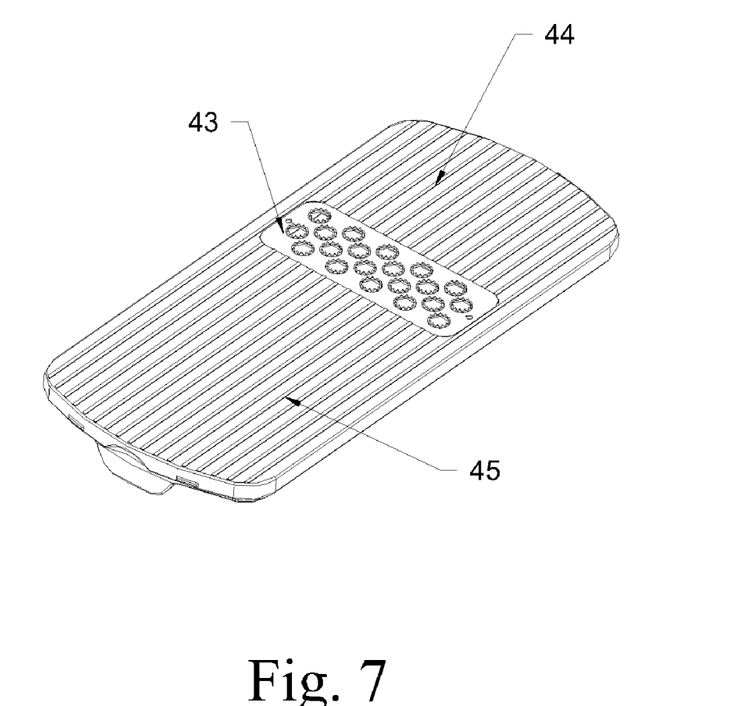
FIG. 7 is a schematic view of a cutting board of an integrated cleaning and cutting device in accordance with a second embodiment of the present disclosure.
Figure 8:
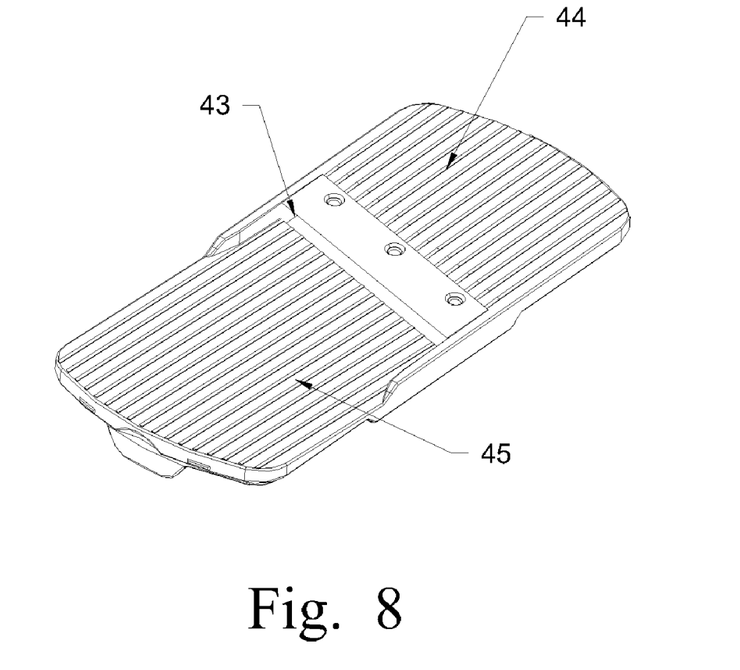
FIG. 8 is a schematic view of a cutting board of an integrated cleaning and cutting device in accordance with a third embodiment of the present disclosure.

Referring to FIGS. 4, 5 and 6, a cutting mechanism is furnished on the cover 2 for cutting the salad material. Due to the drive mechanism on the cover 2 being a planet gear mechanism, the wheel 22 can be located on a lateral side of the cover 2 instead of the center thereof, and the cutting mechanism can be located on another lateral side of the cover 2 to fully exploit the space of the cover 2 and form a compact construction. Specifically, a step 41 is formed at the other lateral side of the cover 2, with an opening 42 defined therein. The cutting mechanism comprises a cutting board 44 detachably fitted in the opening 42 of the step 41, with a plurality of blades 43 mounted thereon. Corresponding to the opening 42, a plurality of blanking holes 8 are defined in the basket shelter 4 for the cut salad material to fall into the case 1. The salad material is cut into a predetermined shape by the blades 43 when sliding on the cutting board 44. As shown in FIG. 6, the salad material is cut into strips with a cross-section thereof being rectangular in shape. FIG. 7 shows a cutting board 44 of the device in accordance with a second embodiment, and the salad material is cut by such a cutting board 44 into strips with a cross-section thereof being petaling in shape. FIG. 8 shows a cutting board 44 of the device in accordance with a third embodiment, and the salad material is cut by such a cutting board 44 into flakes. As described above, the device can be equipped with different cutting boards 44 having different blades 43 to cut the salad material into different shapes, adding to the artistic appearance of the salad.

Referring to FIGS. 6, 7 and 8, a plurality of guiding grooves 45 are preferably defined in the cutting board 44, an elongated direction of which being aligned with the sliding direction of the salad material. Therefore, the salad material is guided to slide in a single direction and a changeable sliding direction caused by an uneven force is prevented to ensure a uniform shape of the cut salad material.

Figure 9:
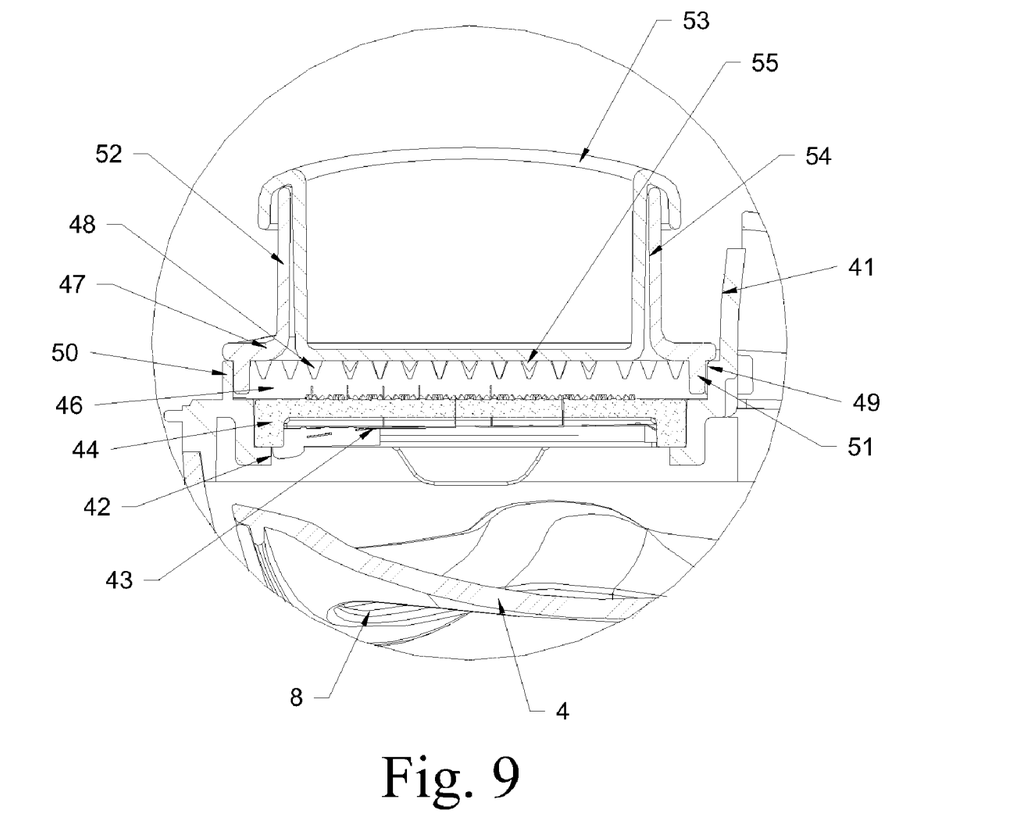
FIG. 9 is an enlarged view of part II in FIG. 4.

Referring to FIGS. 4, 6 and 9, a slideway 46 is defined above the opening 42 of the step 41 for a scrub board 47 sliding therein. A plurality of pins 48 protrude downwardly from the bottom of the scrub board 47. Specifically, a secondary step 49 formed in one side of the step 41 and a baffle plate 50 formed at an opposite side of the step 41 cooperatively define the slideway 46 therebetween. Corresponding to the slideway 46, a slide rail 51 is formed at the bottom of the scrub board 47. When cutting the salad material, the pins 48 of the scrub board 47 are inserted into the salad material, and the scrub board 47 with the salad material is slid in the slideway 46 back and forth to thereby cut the salad material into a desired shape such as flakes or strips etc. Referring to FIG. 5, the plurality of blanking holes 8 are preferably arranged circumferentially in the basket shelter 4. In the present embodiment, a plurality of concaved portions are formed in the basket shelter 4 due to a plurality of orientation grooves 29 being defined in the edges of the basket shelter 4 connecting the basket 3. The blanking holes 8 are defined preferably in the bottoms of the concaved portions to be configured as a funnel shape, such that the cut salad material easily falls into the basket 3 and does not fall between the case 1 and the basket 3 along the basket shelter 4.

Figure 10:
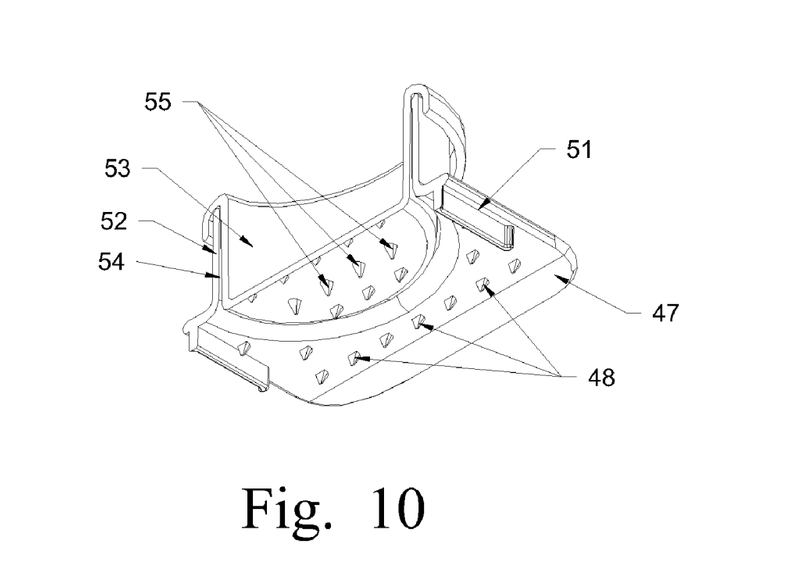
FIG. 10 is a schematic view of the scrub board of the integrated cleaning and cutting device in FIG. 4.

Referring to FIGS. 6, 9 and 10, a tubal grab handle 52 extends upwardly from the scrub board 47 for conveniently operating the scrub board 47 to slide in the slideway 46. A scrub rod 53 is inserted in the grab handle 52. In detail, a tunnel 54 is defined in the grab handle 52 for embedding the scrub rod 53 therein. Similar to the pins 48 of the scrub board 47, a plurality of pins 55 extend downwardly from the bottom of the scrub rod 53. The scrub rod 53 can be barely utilized with the pins 55 thereof inserting into the salad material to directly slide back and forth on the cutting board 44 when the salad material has a large volume, while the salad material becomes thin after being cut for a moment, the remaining salad material can be removed off the scrub rod 53 and secured on the bottom of the scrub board 47 to slide in the slideway 46 for further cutting. Thus, the salad material with different thicknesses is conveniently cut in the device.

Referring to FIGS. 1, 2 and 3, the step 41, in which the cutting mechanism is set forth, is mounted by a lateral cover 56. The lateral cover 56 is consistent with the cover 2 to form a uniform appearance of the device, functioning as a shield to prevent dusts entering into the device, and to avoid damage by the blades 43 of the cutting board 44 when the cutting mechanism is not in use.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An integrated cleaning and cutting device comprising:
   a case;
   a cover covering the case;
   a basket received in the case, the basket having a plurality of palings formed thereon; and
   a basket shelter mounted on the basket, the basket shelter comprising a blanking hole;
   wherein a drive mechanism is coupled to the cover for driving the basket to rotate in the case, and a cutting mechanism adapted for cutting salad material is fitted in the cover and communicates in the case with the basket via the blanking hole.

2. The integrated cleaning and cutting device as claimed in claim 1, wherein the drive mechanism comprises a shaft inserted in a middle of the cover, with bottom end thereof fixed with a middle of the basket shelter, and top end thereof engaged with a wheel embedded in a top surface of the cover, the wheel having a handle to operate the wheel to rotate.

3. The integrated cleaning and cutting device as claimed in claim 2, wherein a plurality of planet gears are formed on side walls of the wheel, and a plurality of gears are formed on the top end of the shaft engaged with the planet gears of the wheel to form a planet gear mechanism between the wheel and the shaft.

4. The integrated cleaning and cutting device as claimed in claim 3, wherein a brake block is embedded in the top surface of the cover and located at a lateral side of the wheel for decelerating the rotating of the wheel.

5. The integrated cleaning and cutting device as claimed in claim 2, wherein a plurality of orientation grooves are defined in the edges of the basket shelter for engagingly receiving the basket.

6. The integrated cleaning and cutting device as claimed in claim 1, wherein an opening is defined in the cover, and the cutting mechanism further comprises a cutting board fitted in the opening, the cutting board having blades mounted thereon, the blanking hole being defined in the basket shelter corresponding to the opening of the cover.

7. The integrated cleaning and cutting device as claimed in claim 6, wherein the cutting mechanism further comprises a scrub rod with a plurality of pins formed at bottom end thereof adapted for inserting into the salad material.

8. The integrated cleaning and cutting device as claimed in claim 6, wherein a slideway is defined above the opening of the cover, and the cutting mechanism further comprises a scrub board having a slide rail at bottom thereof for matching the slideway, and a plurality of pins formed at the bottom thereof adapted for inserting into the salad material.

9. The integrated cleaning and cutting device as claimed in claim 8, wherein a grab handle extends from the scrub board opposite to the slide rail of the scrub board.

10. The integrated cleaning and cutting device as claimed in claim 9, wherein a scrub rod is embedded in the grab handle with a plurality of additional pins formed at bottom thereof adapted for inserting into the salad material.

11. An integrated cleaning and cutting device for preparing salad material comprising:
- a case adapted for containing cleaning fluid therein for cleaning the salad material;
- a basket received in the case adapted for containing the salad material therein, with a plurality of palings formed thereon;
- a basket shelter mounted on the basket, with at least one blanking hole defined therein to communicate with the basket for the cut salad material falling into the basket; and
- a cover covering the case, the cover being fitted with a drive mechanism for driving the basket to rotate in the case, and a cutting mechanism for cutting the salad material;
- the drive mechanism comprises a shaft rotatably inserted in a middle of the cover, with bottom end thereof fixed with a middle of the basket shelter, and top end thereof engaged with a wheel embedded in a top surface of the cover;
- a receiving room is defined in the top of the cover for receiving the wheel therein, the receiving room has a sleeve formed at a center thereof, the wheel having a spindle matching the sleeve to rotate around the spindle, and a handle biasedly formed thereon to operate the wheel to rotate.

12. The integrated cleaning and cutting device as claimed in claim 11, wherein a plurality of planet gears are formed on side walls of the wheel, and a plurality of gears are formed on the top end of the shaft engaged with the planet gears of the wheel to form a planet gear mechanism between the wheel and the shaft.

13. The integrated cleaning and cutting device as claimed in claim 12, wherein a brake block is embedded in the top surface of the cover and located at a lateral side of the wheel for decelerating the rotating of the wheel.

14. The integrated cleaning and cutting device as claimed in claim 11, wherein a plurality of orientation grooves are defined in the edges of the basket shelter for engagingly receiving edges of the basket.

15. The integrated cleaning and cutting device as claimed in claim 14, wherein a bulge protrudes from a middle bottom of the case and inserts into a dent defined in a middle bottom of the basket, for the basket rotating around the bulge.

16. The integrated cleaning and cutting device as claimed in claim 11, wherein the cutting mechanism is fitted in a step depressed in the cover and comprises a cutting board fitted in an opening defined in the step, the cutting board having blades mounted thereon, the at least one blanking hole matching the opening of the cover.

17. The integrated cleaning and cutting device as claimed in claim 16, wherein a slideway is defined above the opening of the cover, and the cutting mechanism further comprises a scrub board having a slide rail at bottom thereof for matching the slideway, a plurality of pins formed at the bottom thereof adapted for inserting into the salad material, and a grab handle extending from top thereof, and a scrub rod embedded in the grab handle with a plurality of additional pins formed at bottom thereof adapted for inserting into the salad material.

18. The integrated cleaning and cutting device as claimed in claim 16, further comprising a lateral cover covering the step when the cutting mechanism is not in use.

\* \* \* \* \*